(No Model.)
C. A. BERGTOLD.
FISH BOX.
No. 295,517.                     Patented Mar. 25, 1884.
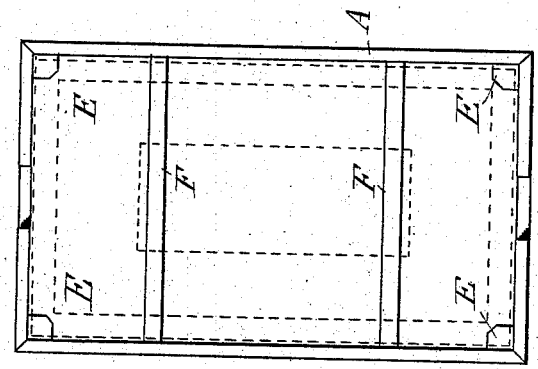
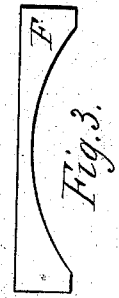
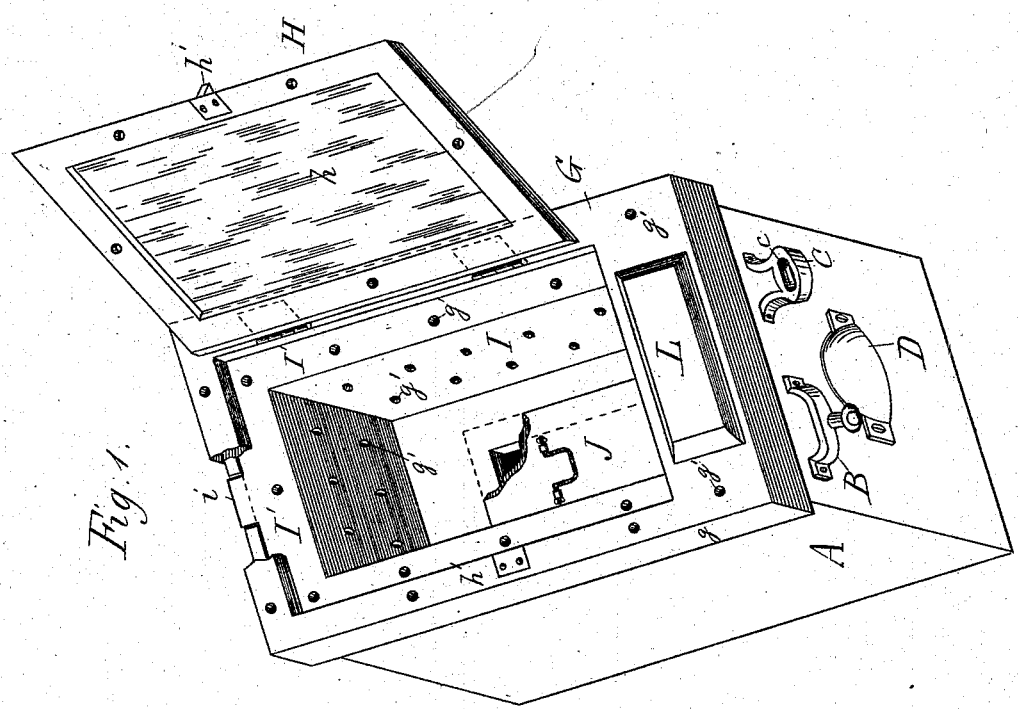
WITNESSES:
Wm. A. Lowe
A. M. Pierce
INVENTOR
Charles A. Bergtold
BY G. W. Morrill
ATTORNEY

UNITED STATES PATENT OFFICE.

CHARLES A. BERGTOLD, OF NEW YORK, N. Y.

FISH-BOX.

SPECIFICATION forming part of Letters Patent No. 295,517, dated March 25, 1884.

Application filed June 4, 1883. (No model.)

*To all whom it may concern:*

Be it known that I, CHARLES A. BERGTOLD, of the city, county, and State of New York, have invented certain new and useful Improvements in Fish-Boxes, of which the following is a full, clear, and exact description, reference being had to the accompanying drawings, and to the letters of reference marked thereon.

My invention relates, especially, to boxes employed for preserving fish and keeping them fresh; and it has for its object the provision of a device which shall be cheap and simple to construct and effective in operation.

To attain this end my invention consists essentially, in a double box, the outer or main box being provided with a removable cover, at one extremity whereof is placed a block whereon the fish are dressed. A door or cover shuts over the inner box, said cover being provided with a glazed panel, this cover or door being hinged to the first-named, and, when opened, resting against two supports at its back. At one extremity of the main box are located a towel-holder and a receptacle for the knife used in preparing the fish for use. The inner box is supported upon cleats vertically located at each corner against the wall of the outer box, extending to the bottom thereof, not only serving to support the inner box, but greatly strengthening the outer one. At the bottom of the inner box is located a trap, through which the space between the bottoms of the two boxes may be reached, as the upper box is much less in depth than the outer, said trap being provided with handles for removing. Across the bottom of the main box extend two cleats cut away in the center. The walls of the inner box are perforated with small holes, and the top of the cover to the main box is perforated in a like manner.

In using my improved fish-box a sponge or woolen cloth saturated with water wherein salt and alum have been dissolved is placed in the open space between the bottoms of the two boxes, and the fish are put in the inner box. The evaporating moisture from the sponge or cloth charges the air between the two boxes, and within the inner box, keeping the fish fresh, and any deleterious odors that, if confined, would hasten decay of the fish, pass out through the perforations in the cover.

In the drawings, Figure 1 is a perspective view of my improved fish-box; and Fig. 2 is a plan view of the outer box with the inner one removed. Fig. 3 is a view in elevation of one of the cleats at the bottom of the main box.

Like letters of reference wherever they occur indicate corresponding parts in all the figures.

A is the main box, constructed of any suitable material.

B is a towel-holder, made of brass, and secured to the end of the box by means of screws.

C is a knife-holder, constructed of like material, the knife-blade being dropped through the perforation $c$.

D is a handle for lifting the box, the other end being provided with a similar handle.

E are cleats at each corner of box A, running from near the top to the bottom.

F are cleats passing across the bottom of box A, said cleats being cut away at their lower side to give free circulation.

G is the top or cover of the main box, having depending edges $g$, and fitting nicely thereon. Said cover is provided with perforations $g'$, through which the interior of the device is ventilated. A cover, H, having a glazed panel, $h$, is hinged to cover G, and provided with a catch, $h'$. When this cover is closed down, a view of the inner box and its contents may be readily obtained.

L is a chopping-block upon one end of cover G, whereon the fish may be dressed, the knife for use for that purpose and the towel for wiping the hands, &c., being handy to the operator.

I is the inner box, provided at its upper edge with a surrounding lip, I', reaching to the walls of box A, said lip resting and being supported upon cleats E, and having handles $i$, passing through the walls of box A, by which the inner box may be removed. Box I and lip I' are perforated at $g$, as shown. At the bottom of box I is a trap-door, J, provided with rope handles for lifting it from place, to reach the space between the bottoms of the boxes in order to moisten the sponge or cloth placed therein.

Having now fully described my invention, what I claim as new therein, and desire to secure by Letters Patent, is—

A fish receptacle and preserving device consisting of main box A, having handles D, towel-holder B, knife-support C, removable top G, having depending edges $g$, perforations $g'$, and dressing-block L, inner box, I, having lip I', handles $i$, trap J, and perforations $g'$, the main box being provided with cleats E and F, and the whole combined and arranged to operate substantially as shown and described.

In testimony that I claim the foregoing I have hereunto set my hand in the presence of two witnesses.

CHARLES A. BERGTOLD.

Witnesses:
A. M. PIERCE,
G. W. MORRILL.